Figure 1:
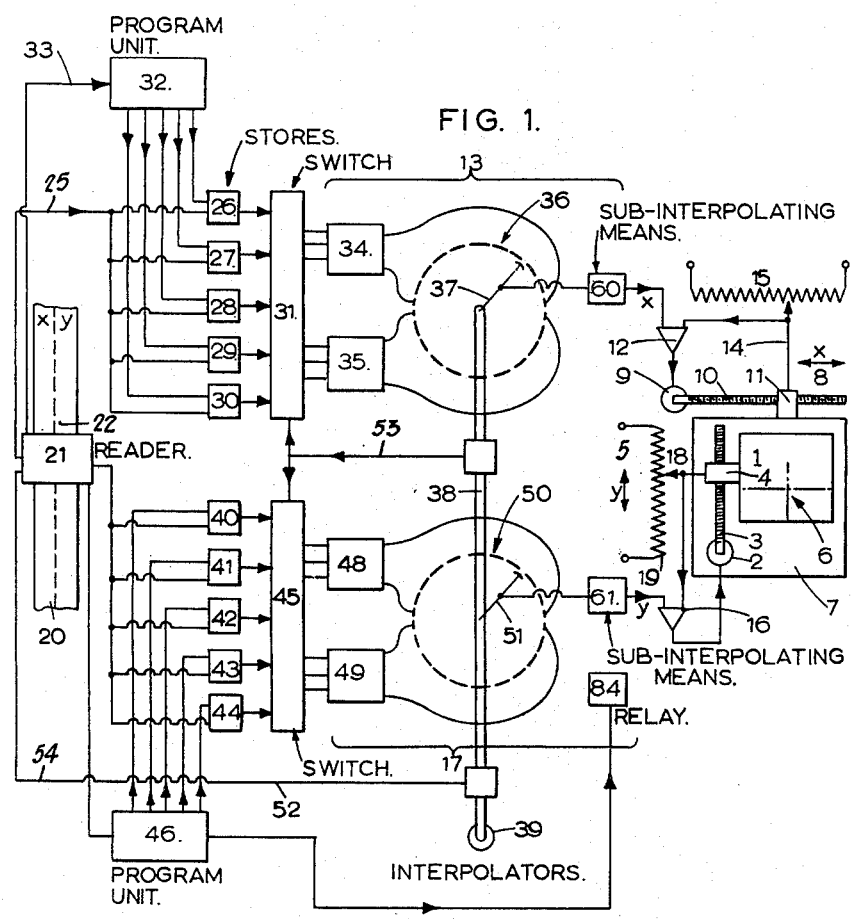

July 18, 1961  R. E. SPENCER  2,992,774
INTERPOLATION DEVICE FOR THE CONTROL OF AUTOMATIC MACHINES
Filed Aug. 21, 1956  2 Sheets-Sheet 2

Inventor
R. E. Spencer () # United States Patent Office 2,992,774
Patented July 18, 1961

2,992,774
INTERPOLATION DEVICE FOR THE CONTROL OF AUTOMATIC MACHINES
Rolf Edmund Spencer, West Ealing, London, England, assignor to Electric & Musical Industries Limited, Hayes, England, a company of Great Britain
Filed Aug. 21, 1956, Ser. No. 605,368
5 Claims. (Cl. 235—61.6)

This invention relates to the control mechanism of automatic machines.

It has been proposed to provide control mechanism for automatic machines such that the relative displacement between a tool holder and a work carrier can be controlled in response to the output of interpolating means which receives input signals representing discrete reference points in a desired locus. For example in United States patent application Serial No. 581,038, filed on April 27, 1956, now Patent No. 2,929,555, control mechanism of this kind is described in which the relative displacement between a work carrier and a tool holder is controlled in different co-ordinate directions in response to quadratic interpolating means which generate output signals representing different co-ordinates as functions of a common non-geometric parameter. The arrangement described in the aforesaid applications enables the machine to be brought temporarily to rest at the end point of a span, if for example it is desired to produce an abrupt change of direction. For example assuming that it is required to machine a straight line AC on a workpiece, then as described in the aforesaid co-pending applications, the machine is brought temporarily to rest by applying to the quadratic interpolating means input signals representing the co-ordinates of three points A, B and C such that B divides the line AC in the ratio 3.1.

When a straight line of substantial length has to be machined it is feasible to divide the line into a number of spans, the beginning and end spans being relatively short and divided unequally by the points for which input signals are recorded so as to give automatic acceleration and retardation at the beginning and end of the run. In this way accuracy at the corners can be combined with a high speed of operation. On the other hand there are many cases where the profile to be machined includes a number of short straight lines, or lines of uniform curvature, and the extra computation needed to divide these lines into a number of spans in order to produce automatic acceleration at the beginning of the line and automatic retardation at the end may be embarrassing.

Moreover the time required by the machine to read the extra data, if the spans are short, may impose a restriction on the speed of operation of the machine, since the time required to read data is often the limiting factor in the operational speed, especially with a hydraulic machine. If the spans are sufficiently long to give time for reading the operational speed may still be less than the optimum, since if acceleration is linear over a complete span, the average speed of the machine cannot be more than half the maximum speed.

The object of the present invention is to provide an improved control mechanism for an automatic machine in which automatic acceleration or retardation can be achieved on relatively short spans without resorting to the expedient described above.

In co-pending United States application Serial No. 602,632, filed on August 7, 1956, automatic control mechanism is described, having a similar object in view, and comprising interpolating means for generating control signals to produce relative displacement between two components of the machine in response to input signals which represent discrete reference points defining a desired locus, and means responsive to a predetermined control signal for causing said interpolating means to generate control signals capable of varying the rate of relative displacement between said components in a predetermined manner independently of the choice of said reference points.

The present invention provides another solution to the same problem and according to the present invention there is provided control mechanism for generating signals suitable for controlling displacement of part of an automatic machine, comprising a source of input signals representing values of a function at relatively widely spaced values of a variable of the function, principal interpolating means comprising a plurality of input terminals for receiving signals from said source, a greater number of output terminals, and couplings from said input terminals to said output terminals, for setting up at said output terminals, in response to signals received at said input terminals, interpolated signals respectively representing values of the function at a series of relatively close values of the variable which have a constant interval of the variable between them and at an additional value of the variable spaced from an end value of said series by a smaller interval, principal selector means movable to derive interpolated signals from successive pairs of said output terminals, subinterpolating means for deriving an incremental signal representing a fraction of the difference between the interpolated signals derived from a pair of terminals, and means for adding said incremental signals to one of said interpolated signals to produce an output signal, said subinterpolating means including subsidiary selector means for varying said fraction, and being responsive to the position of said selector means to produce linear variation of said fraction with respect to movement of said subsidiary selector means for output terminals corresponding to pairs of said series of values of the variable, and to produce non-linear variation of the fraction with respect to movement of said selector means for the output terminals corresponding to said end value and said additional value of the variable.

Figure 2:
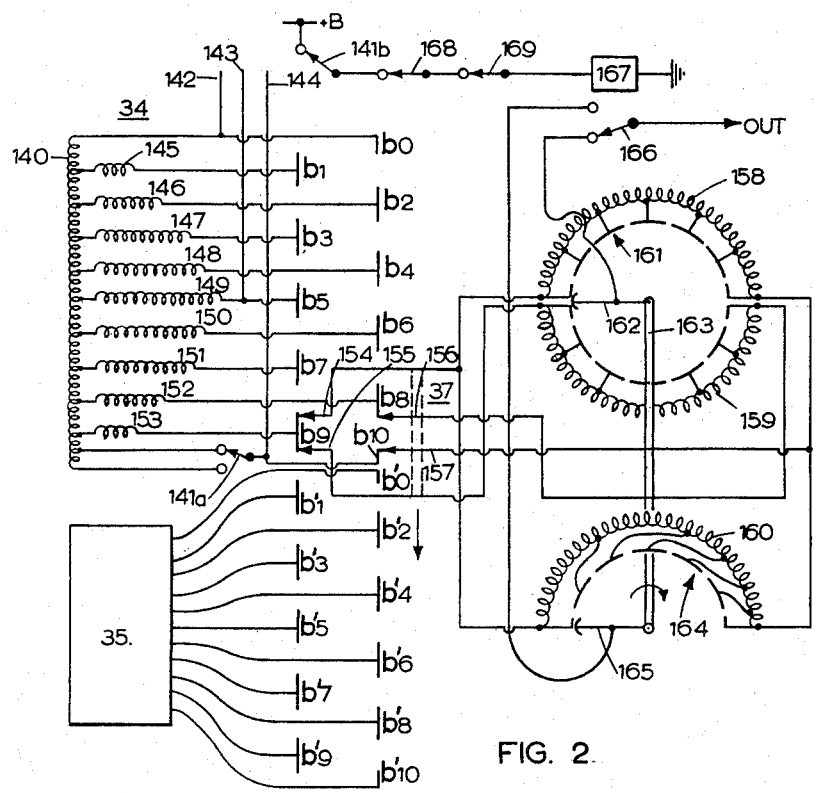
Figure 3:
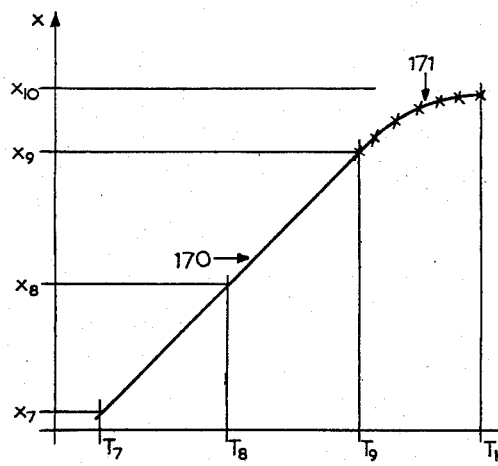

In order that the invention may be clearly understood and readily carried into effect, the invention will be described with reference to the accompanying drawings, in which:

FIGURE 1 illustrates mainly in block form one example of an automatic machine having control mechanism according to the first-mentioned form of the invention, FIGURE 2 illustrates in greater detail part of the control mechanism of FIGURE 1, and FIGURE 3 is a graph explanatory of the operation of FIGURE 2.

Referring to the drawing, reference 1 represents the worktable of an automatic machine, for example an automatic milling machine, mounted on a slide so that it can be displaced in a horizontal plane in one co-ordinate direction by a servo-motor 2 through the intermediary of a lead screw 3 and nut 4. The servo motor 2 can effect displacements in the directions denoted by the arrow 5 and it controls the y co-ordinate displacement of the worktable 1 with respect to the axis of the tool holder, which is represented in the drawing by the reference 6, and may be taken as determining the origin of a two dimensional co-ordinate system. The slide on which the table 1 is mounted is represented by the rectangle 7 and the slide can be moved in a horizontal plane in the directions indicated by the arrow 8 by means of a servo motor 9, through the intermediary of screw and nut mechanism 10 and 11. The servo motor 9 therefore controls the x co-ordinate displacement between the worktable 1 and the axis 6 of a tool holder. The tool holder itself is not shown in the drawing. Relative displacements between the table 1 and the tool holder in the indicated co-ordinate directions are denoted respectively by x and y and in practice are controlled to cause the tool axis to describe a locus such that a desired profile is cut on a workpiece secured to the table 1. The operation of the servo-motor 9 is controlled by the output of an amplifier 12 which receives virtually continuously variable input signals from interpolating means represented in general by the reference 13 and negative feedback signals from the tap 14 of potentiometer 15, the tap being driven in known manner so that the signal derived from the potentiometer is a voltage analogue of the instantaneous value of $x$.

Similarly the servo motor 2 derives its input signal from an amplifier 16 which receives a virtually continuously variable input signal from interpolator means represented in general by the reference numeral 17. The amplifier 16 also receives a negative feedback signal which is the analogue of the instantaneous value of $y$ from the tap 18 of potentiometer 19. The interpolating means 13 and 17 set up, as output signals, alternating voltages having amplitudes which are analogous to the desired values of $x$ and $y$ at any instant and the potentiometers 15 and 19 are energised with alternating voltages of fixed amplitude and having the same phase as the output voltages from the quadratic interpolating means. The amplifiers 12 and 16 may, it will be understood, incorporate rectifying means as required. Moreover, the potentiometers 15 and 19 are merely shown symbolically and may in practice comprise several cascaded rotary potentiometers.

The interpolating means 13 and 17 are responsive to signals representing discrete values of $x$ and $y$ recorded on a punched tape 20 and derived therefrom by means of a tape reader 21. The values on the tape may be recorded in two columns the division between which is represented in the drawing by the dotted line 22. It will be assumed that the column to the left of 22 contains successive discrete values of $x$ and the column to the right of 22 contains successive discrete values of $y$. It will also be assumed that each row of holes recorded on the tape corresponds to a single value of $x$ and the corresponding value of $y$, the rows being equally spaced. Many other methods of recording may however be adopted. Each row therefore normally represents the $x$ and $y$ co-ordinates of a reference point of the locus to be described by the axis 6 of the tool holder. When the tape reader is operated to sense a recorded value of say $x$, the output is in the form of a group of pulses which is a binary-decimal code representation of the corresponding value of $x$. This group of pulses is applied by a series of parallel conductors, which are represented in the drawing by a single connection 25, to five temporary stores denoted by the references 26 to 30 inclusive. The stores 26 to 30 are normally insensitive to signals applied to them by the tape reader but are sensitised in cyclic order by a programme unit 32, an interlock being provided by the connection 33 between the programme unit 32 and the tape reader 21 to ensure proper synchronism between the tape reader 21 and the programme unit 32.

For the purposes of the present application each store may be regarded merely as an auto-transformer, the tap on which is set in response to binary decimal code signals applied to it from the tape 20, so that the alternating voltage derived from the tap has an amplitude which is the analogue of the corresponding co-ordinate value. Therefore when any of the stores 26 to 30 is sensitised to receive the output from the tape reader 21, the respective store is caused to set up an alternating voltage whose amplitude is the analogue of the corresponding reference point value of $x$ derived from the record 20. The voltage analogues set up by stores 26 to 30 are applied by a selector switch 31 in successive groups of three to the three input terminals of a quadratic interpolator 34 and to the three input terminals of a second quadratic interpolator 35, the interpolators 34 and 35 forming part of the means 13. Each of the interpolators 34 and 35 has, say, eleven output studs, and the two groups of output studs are arranged to form a stud circle represented by the dotted line 36. The end studs of each group of eleven are however "half" studs, such that each half stud forms, with the adjacent half stud of the other interpolator a composite stud which, though composed of two electrically separate halves, corresponds in other ways to the other studs. In FIGURE 1 for simplicity, output connections are shown from the interpolators to the first and last "half" studs of each group only. The stud circle 36 is scanned by a brush 37 mounted on a shaft 38 which is driven by an electric motor 39. The operation of the selector switch 31 is controlled by the shaft 38, as indicated by the connection 53 so that when a sequence of signals representing the $x$ co-ordinates of successive reference points, say $x_1$, $x_2$, $x_3$ . . . etc., are applied in cyclic order to the stores from the record 20, $x_1$, $x_2$ and $x_3$ are applied to the interpolator 34 and $x_3$, $x_4$ and $x_5$ are applied to the interpolator 35. Then $x_5$, $x_6$ and $x_7$ are applied to the interpolator 34, $x_7$, $x_8$ and $x_9$ are applied to the interpolator 35 and so on. After the stores 26, 27 and 28 have been sensitised to set up the three voltage analogues $x_1$, $x_2$ and $x_3$, interpolation can be started by rotation of the shaft 38 to cause the brush 37 to traverse the group of output studs of the interpolator 34 and thus interpolate over the full span from $x_1$ to $x_3$. While this is in progress the analogues $x_4$ and $x_5$ are set up in the stores 29 and 30 and $x_3$, $x_4$ and $x_5$ are applied to the input terminals of the interpolator 35, so that as continued rotation of the shaft carries the contact 37 to the group of output studs of the interpolator 35, the interpolator is in a condition to take over from the interpolator 34 and produce interpolation in the span from $x_3$ to $x_5$. It will be appreciated that the selector switch 31 is required virtually to advance the stores 26 to 30 by one position, with respect to the input terminals of the interpolators 34 and 35 once per half revolution of the shaft 38. As will appear from FIGURE 2, the brush 37 has four separate contacts and at any instant an output is derived by two of these contacts from two adjacent studs of the circle 36. The voltage difference between these adjacent studs is termed the sub-span voltage and it is applied to sub-interpolating means 60 from which the ultimate output of the interpolating means 13 is derived. This ultimate output, which constitutes the input signal to the amplifier 12 consists of the voltage derived from one stud of the circle 36 plus or minus an increment derived from the sub-interpolator 60, the increment being a fraction of the sub-span voltage. In FIGURE 1 for simplicity, only one contact is shown on the brush 37 and only one connection is shown to the sub-interpolating means 60.

Signals representing the $y$ co-ordinates of successive reference points derived from the tape reader 21 are applied by a connection 54 to a further series of five temporary stores 40 to 44, sensitised in the same way as the stores 26 to 31 by a programme unit 46 which is interlocked with the tape reader as represented by a connection 47. The voltage analogues set up by the stores 40 to 44 are applied by a selector switch 45 to the three input terminals of a quadratic interpolator 48 and to the three input terminals of another quadratic interpolator 49 in the same kind of sequence as that described for the stores 26 to 30 and the interpolators 34 and 35. The interpolators 48 and 49 form part of the interpolating means denoted in general by the reference 17 and their output voltages are applied to the respective halves of a stud circle 50 corresponding to the stud circle 36. The stud circle 50 is scanned by brush 51 mounted on the same shaft 38 and in the same relative position as the contact 37. The output of the brush 51 is applied, as in the case of the brush 37, to the amplifier 16 for the servo-motor 2, but first passes through sub-interpolating means 61, similar to the means 60. As aforesaid shaft 38 is driven by servo-motor 39 and a synchronous link represented by the connection 52 is provided between the shaft 38 and the tape reader 21, to ensure that the interpolating means 13 and 17 do not over-run the tape reader since it will be appreciated that the tape reader must always be at least three positions ahead of the interpolating means.

The parts of the machine so far described have been shown merely in block form, in order to complete the illustration of the present invention. Constructional details, which do not form part of the present invention, are described in the complete specification of co-pending United States patent application Serial No. 581,038. However as compared with the machine described in that complete specification the sub-interpolating means of the machine illustrated in FIGURE 1, which normally effect linear sub-interpolating, can be conditioned so that over selected sub-spans of the output of the quadratic interpolators 34, 35, 48 and 49 the sub-interpolation is quadratic. The conditioning is affected by means of a relay 84 which can be energised in response to a predetermined signal recorded on the record 20. The operation of a relay in response to predetermined code signals is well known in the art, and details of the operating mechanism for the relay 84 have not therefore been shown. For example it may be operated by a code signal not used for representing a co-ordinate or by a code signal, in a track or position of the tape reserved for non-dimensional instructions.

In the form of the invention illustrated control of the acceleration or deceleration of the machine is exercised by the sub-interpolating means used in conjunction with the principal quadratic interpolating means. The illustration in FIGURE 2 has been confined to one interpolating means, namely the interpolating means 13 for the $x$ co-ordinate. The individual interpolator 34 comprises an auto-transformer 140. In a normal quadratic interpolator, such as illustrated in co-pending United States patent application Serial No. 581,038 the corresponding studs of the stud circle 36 would be connected to equi-spaced taps on the auto-transformer 140. While this is true in FIGURE 2 of the first ten studs, denoted by references $b_0$ to $b_9$, the last stud $b_{10}$ is connected to a switch 141a. The three input leads from the selector switch 31 are, as normal, connected to the studs $b_0$, $b_5$ and $b_{10}$, such leads being denoted by references 142 to 144. The switch 141a has two conditions in one of which it connects the last stud $b_{10}$ to the end point of the auto-transformer 140, in which case the interpolating means is entirely normal. However in the other condition of the switch 141a, which is that shown in the drawings, the end stud $b_{10}$ is connected to the mid-point of the last section, or sub-span, of the auto-transformer 140. The windings 145 to 153 of a second transformer are connected selectively in the leads from the taps on the auto-transformer 140 to the studs $b_1$ to $b_{10}$. The winding 149 is the primary winding of this second transformer, and the number of turns in the windings 145 to 153 are related according to a quadratic law such that if three co-phasal alternating voltages, with amplitudes representing successive values of one co-ordinate of a locus are applied by leads 142 to 144, the voltages set up at the studs $b_0$ to $b_{10}$ represents the values of more closely spaced co-ordinates on a quadratic curve defined by the input voltages. The second interpolator 35 is identical with 34 and, in FIGURE 2, is shown only as a rectangle having output leads connected to studs $b'_0$ to $b'_{10}$ which form the corresponding half of the stud-circle 36.

To facilitate sub-interpolation of the sub-spans represented by the spacing of the studs $b_0$ to $b_{10}$ and $b'_0$ to $b'_{10}$ these studs are not arranged in a single row, as shown for simplicity in FIGURE 1, but are arranged in two rows containing respectively the odd and even numbered studs. The relative angular spacing of the studs is nevertheless preserved. For convenience of illustration each circular row is shown as a straight line in FIGURE 2. Furthermore as shown in FIGURE 2, the brush 37 has four contacts 154 to 157 with one pair 154, 155 arranged to scan one row of studs and the other pair 156, 157 arranged to scan the other row of studs. For linear sub-interpolation, two auto-transformers 158 and 159 are provided having their ends connected as shown to the contacts 154 to 157. For quadratic sub-interpolation, a single auto-transformer 160 is provided having its ends connected to the contacts 154 and 157. Only one auto-transformer 160 is required for quadratic sub-interpolation, since as will appear, quadratic sub-interpolation is only employed in the last sub-span generated by the interpolators 34 or 35 and during this sub-span, the output is always derived from the same pair of contacts 154 and 157 of brush 37.

Linearly spaced tappings on the auto-transformers 158 and 159 are connected to equi-angularly spaced studs which form a stud circle 161, similar to stud circle 36 (though the number of studs may be different) and scanned by a single-contact brush 162. The latter is mounted on a shaft 163 driven by, but geared up from, the shaft 38 so as to perform one half revolution for a displacement of brush 37 equal to the distance between centres of the adjacent studs in the circle $b_0$ to $b'_{10}$. Quadratically spaced tappings on the auto-transformer 160 are connected to equi-angularly spaced studs which form a half circle 164 and which are scanned by a brush 165 mounted on the shaft 163 in the same angular position as the brush 162. The ultimate output of the arrangement shown in FIGURE 2 is derived either from the brush 162 or the brush 165 depending on the condition of switch 166, this output being of course the input to the amplifier 12. The output is normally derived from the brush 162 but when a relay 167 is energized the switch is changed over to cause the output to be derived from the brush 165. The energising circuit of the relay 167 includes three switches 141b, 168 and 169 connected in series. Switch 141b is ganged with switch 141a, switch 168 is closed by the brush 37 each time the brush first engages the stud $b_{10}$ (or $b'_{10}$) and switch 169 is closed by brush 165 each time 165 commences to scan its auto-transformer 160. The switch 168 has a "closed" period sufficiently long to cover any uncertainty as to the position of the brush 37, since the actual switching time is determined precisely by the high speed shaft 163. Relay 167 may have a hold circuit which is broken when brush 165 leaves its autotransformer 160, or alternatively the switches 168 and 169 may remain operated as long as the relay is required to be in its energised stage.

The $y$ co-ordinate interpolating means 17 is of the same construction as illustrated in FIGURE 2.

The relay 84 of FIGURE 1 is used to operate the switches 141a and 141b, and the corresponding switches in the $y$ interpolating means 17. When the relay 84 is not energised, the operation of the control mechanism is normal. For example, the interpolator 34 or 35, depending on the position of the brush 37 generates signals representing $x$ co-ordinates of a series of points on a quadratic curve determined by the input signals, the variable of the curve being an independent parameter represented by the position of the taps on the auto-transformer 140. In the case under consideration the interval of the variable between the successive values represented by said taps is constant and assuming the shaft 38 is driven at constant speed or is stepped forward in linear steps, the variable has a linear rate of change with respect to time T. The generated signals are set up at the studs $b_0$ to $b_{10}$ (or $b'_0$ to $b'_{10}$ as the case may be) and the brush 37 derives signals from two adjacent studs and applies them to opposite ends of one of the auto-transformers 158 or 159. The voltage applied to 158 or 159 is called a sub-span voltage. The brush 162 is positioned relative to the brush 37 so that it always scans the auto-transformer to which a sub-span voltage is applied and being (as aforesaid) geared up from the shaft 38, it sub-divides linearly the sub-span voltage so that the output of the interpolating means is equal to the voltage on one of the studs engaged by the brush 37, plus a fraction of the sub-span voltage added by the auto-transformer 158 or 159. The auto-transformers 161 and 162 therefore constitute linear sub-interpolating means. Assume however that it is desired to stop the machine as rapidly as possible at the end of a relatively long linear span in the locus, the $x$ co-ordinates of the ends of the span being represented by input signals applied to the leads 142 and 144. No input signal need be applied in such a case to the lead 143, and the winding 159 may if desired be automatically short-circuited when a linear span on the locus is encountered, to disable the quadratic transformer. When the input signals are applied to 142 and 144, the relay 84 is energised and the switches 141a and 141b are changed from their normal condition to that shown in FIGURE 2. This means that the signal on the lead 144 is applied to the auto-transformer 140 at a point one half sub-span inside the normal end point. The changeover of switch 141a also connects stud $b_{10}$ to this new feed-point. The voltage applied by the auto-transformer 140 to the studs are then such that there are equal amplitude differences between adjacent studs in the range from $b_0$ to $b_9$, but the amplitude difference between $b_9$ and $b_{10}$ is only one half of this value. The interval of the variable between the values represented by the taps on the auto-transformer 140 is now constant only for the taps connected to the series of studs $b_0$, $b_9$, and the interval is reduced to a half between the taps connected to $b_9$ and $b_{10}$. The rate of change of the variable with respect to time T is therefore not linear throughout the whole range covered by the studs $b_0$ to $b_{10}$ although the studs are still traversed at a linear rate by the shaft 37. This is represented in FIGURE 3, in which $x_7$ to $x_{10}$ denote the amplitude of the voltages at studs $b_7$ to $b_{10}$ respectively, the positions of the studs being represented by vertical lines denoted by the references $T_7$ to $T_{10}$. Up to the point $T_9$ the operation of the interpolating means is normal, and linear sub-interpolation causes the output voltage to represent $x$ as a linear function of T, as denoted by the straight line 170 in FIGURE 3. As T is time, this means that the $x$-displacement of the work table occurs at a uniform rate. However when the brush 37 reaches stud $b_{10}$, that is the position shown in FIGURE 2, the action of switches 168 and 169 energises the relay 167 so that during the next sub-span from $x_9$ to $x_{10}$, the sub-interpolation is quadratic within the final half-interval of the variable. Successive output voltages for equal increments of T, measured from $T_9$, are represented by the crosses in FIGURE 3 and it will be seen that $x$ is now generated as a quadratic function 171 of T. Moreover the derivative of this function $dx/dT$ at $T_{10}$ is zero. The $x$-component of the displacement of the worktable is therefore rapidly reduced in the sub-span $x_9$ to $x_{10}$ and theoretically vanishes at $T_{10}$. It will be noticed in FIGURE 2 that the contact 157 of brush 34 will move over to stud $b'_0$ of the interpolator 35 before the sub-span $x_9$ to $x_{10}$ is completed, but the voltage $x_{10}$ is also applied to $b'_0$ so that no disturbance occurs. As aforesaid the $y$ co-ordinate interpolating means are of the same construction as FIGURE 2, and therefore the $y$ co-ordinate displacement of the worktable is decelerated in the same way as the $x$ co-ordinate displacement. If $dx/dT$ and $dy/dT$ are both simultaneously zero at $T_{10}$ then clearly the worktable will be brought to a stop at the point $x_{10}$, $y_{10}$ on the locus being described.

It will be appreciated that in FIGURE 3 the subscripts do not denote reference point numbers, but only sub-span boundaries in a span defined by reference points.

An arrangement similar to FIGURES 1 and 2 can also be used for producing rapid acceleration at the beginning of a span. In this case, the quadratic sub-interpolator would be used in the first sub-span of the interpolation variable, which would be halved in length. Moreover the order of tappings on the auto-transformer corresponding to 160 would have to be reversed.

In a practical arrangement of FIGURE 2, assuming 25 studs for each quadratic interpolator, deceleration is effected in 4 percent of the time, and 2 percent of the distance of a span. In a hydraulic machine a stop from maximum rate of travel may for example be achieved in about $\frac{1}{16}$ inch. Therefore the arrangement is valuable on linear spans exceeding 3 inches, but for shorter linear spans, arrangements such as shown in co-pending United States application Serial No. 602,632, are preferable.

Obviously the invention is applicable to mechanism which uses other than cartesian co-ordinate systems and also to mechanism allowing for three dimensional control. Moreover the control signals generated by the control mechanism may be adapted to displace other parts of the machine, rather than the worktable. For example, one or more of the co-ordinate displacements may be imparted to the tool holder.

The brushes of the quadratic interpolating means may not be continuously rotated, as by the shaft 34, but may be advanced intermittently by a stepping switch operated by the high speed shaft 163 of the sub-interpolating means.

The record used for the control mechanism may be other than a punched tape and the recorded signals instead of defining points on the locus of the tool axis (as indicated above for simplicity), may define points on the actual profile to be cut. In this case provision is required to compensate for the dimension of the tool, and this provision may be as described in co-pending United States patent application Serial No. 524,720, filed on June 29, 1955.

What I claim is:

1. Control mechanism for generating signals suitable for controlling displacement of part of an automatic machine, comprising a source of input signals representing values of a function at relatively widely spaced values of a variable of the function, principal interpolating means comprising a plurality of input terminals for receiving signals from said source, a greater number of output terminals, and potential dividing means connected to said input terminals and said output terminals for setting up at said output terminals, in response to signals received at said input terminals, interpolated signals respectively representing values of the function at a series of relatively close values of the variable which have a constant interval of the variable between them and at an additional value of the variable spaced from an end value of said series by a smaller interval, principal selector means movable to derive interpolated signals from successive pairs of output terminals, sub-interpolating means comprising further potential dividing means for deriving an incremental signal representing a fraction of the difference between the interpolated signals derived from a pair of terminals and means for adding said incremental signals to one of said interpolated signals to produce an output signal, said sub-interpolating means including subsidiary selector means for varying said fraction, and switch means responsive to the position of said principal selector means for conditioning said sub-interpolating means to produce linear variation of said fraction with respect to movement of said subsidiary selector means for output terminals corresponding to pairs of said series of values of the variable, and to produce non-linear variation of the fraction with respect to movement of said subsidiary selector means for the output terminals corresponding to said end value and said additional value of the variable.

2. Control mechanism for generating signals suitable for controlling displacement of a part of an automatic machine, comprising a source of input signals representing values of a function at relatively widely spaced values of a variable of the function, principal interpolating means comprising a plurality of input terminals for receiving signals from said source, a greater number of uniformly spaced output terminals, potential dividing means connected to said input terminals and said output terminals for setting up at said output terminals, in response to signals received at said input terminals, interpolated signals respectively representing values of a function at a series of relatively close values of the variable which have a constant interval of the variable between them and at an additional value of the variable spaced from an end value of the series by half said interval, principal selector means movable to derive interpolated signals from successive pairs of said output terminals, sub-interpolating means comprising further potential dividing means for deriving an incremental signal representing a fraction of the difference between the interpolated signals derived from a pair of terminals, and means for adding said fraction to one of said derived signals to produce an output signal, said sub-interpolating means including subsidiary selector means for varying said fraction, and switch means responsive to the position of said principal selector means for conditioning said sub-interpolating means to produce linear variation of said fraction with respect to movement of said subsidiary selector means for output terminals corresponding to pairs of said series of values of the variable and to produce quadratic variation of said fraction with respect to movement of said subsidiary selector means for the output terminals corresponding to said end value and said additional value of the variable.

3. Control mechanism according to claim 1, said sub-interpolating means comprising a linearly tapped potential divided, a non-linearly tapped potential divider, a first subsidiary series of uniformly spaced output terminals connected respectively to the taps of said linearly tapped potential divider, a second subsidiary series of uniformly spaced output terminals connected respectively to the taps of said non-linearly tapped potential divider, said subsidiary selector means comprising a first selector movable from one terminal to the next of said first subsidiary series, a second selector movable from one terminal to the next of said second subsidiary series, and switch means responsive to the position of the principal selector means for deriving said fraction selectively from said first and second selectors.

4. Control mechanism according to claim 1, said source of input signals comprising reading means for deriving signals from a record, a plurality of temporary stores for simultaneously storing groups of said signals, and means for selecting groups of the stores in cyclic order and applying signals stored therein as input signals to said interpolating means.

5. Control mechanism according to claim 4, comprising switch means responsive to a predetermined signal from said reading means for selectively enabling and disabling said subsidiary interpolating means for non-linear variation of said fraction.

References Cited in the file of this patent
UNITED STATES PATENTS

| | | |
|---|---|---|
| 2,572,545 | Walker | Oct. 23, 1951 |
| 2,704,936 | Vine et al. | Mar. 29, 1955 |
| 2,781,967 | Spencer et al. | Feb. 19, 1957 |
| 2,843,822 | Scott | July 15, 1958 |
| 2,929,555 | Spencer et al. | Mar. 22, 1960 |